Nov. 12, 1935.  K. L. HERRMANN  2,020,837
MACHINE FOR CUTTING ROLLER BLANKS
Filed June 11, 1934  2 Sheets-Sheet 1
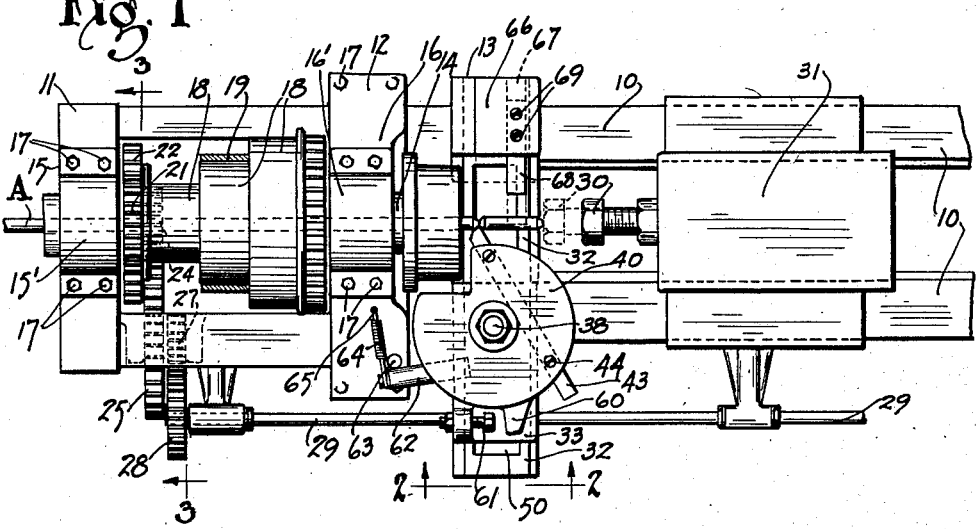
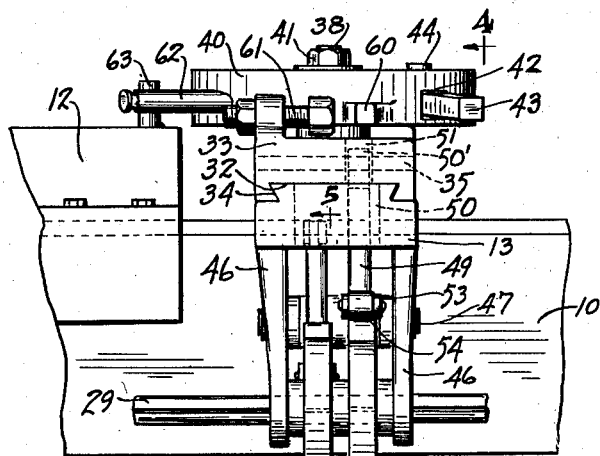
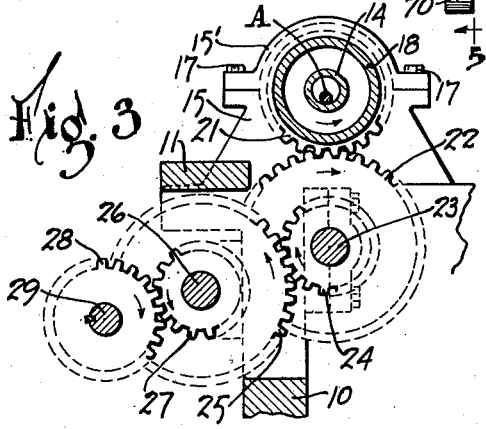
INVENTOR.
Karl L. Herrmann
BY
ATTORNEY

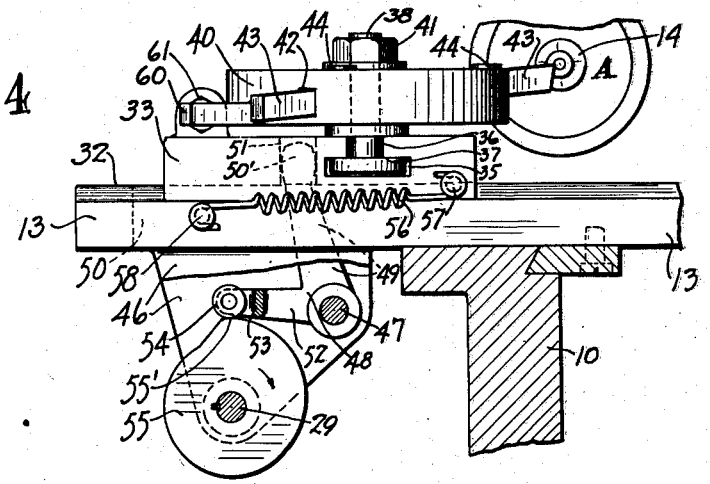
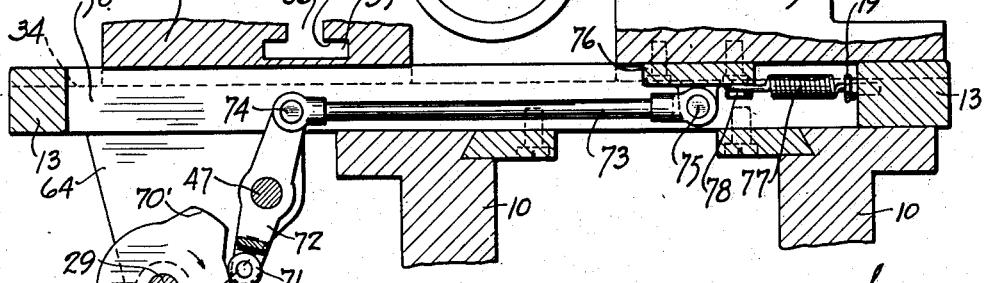
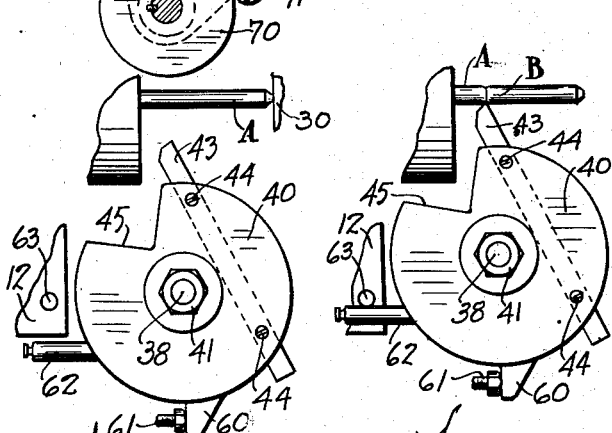
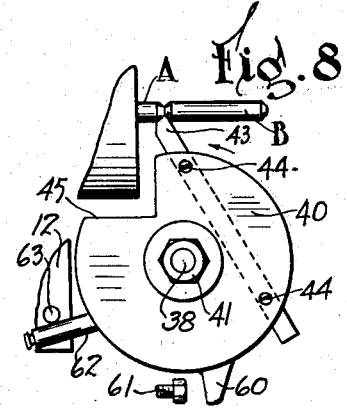

Patented Nov. 12, 1935

2,020,837

UNITED STATES PATENT OFFICE 2,020,837

MACHINE FOR CUTTING ROLLER BLANKS

Karl L. Herrmann, South Bend, Ind., assignor to The Bantam Ball Bearing Company, South Bend, Ind., a corporation of Indiana Application June 11, 1934, Serial No. 729,970

12 Claims. (Cl. 29—27)

This invention relates to wire or rod-cutting machines, and particularly to machines for cutting blanks having a predetermined length adapted for use as quill rollers.

The principal object of my invention is to provide a machine having an automatically operated cutter movable to cut wire or rods into predetermined lengths, the pieces so formed being usable as blanks adapted to be finished into quill rollers.

Another object is to provide a machine having an automatically operated cutter movable obliquely to the work and operable to cut tapered ends on blanks adaptable to be finished into quill rollers.

Another object is to provide a machine having an automatically operated cutter movable against the wire or rod to be cut without applying any side thrust against the projected end of the work extending beyond the cutter.

Another object is to provide a machine having an automatically operated break-off member operable to break the roller blanks from the wire or rod after the blank has been partially severed from the latter.

Another object is to provide a machine having an automatically operated cutter and a break-off member timed so that the break-off member will break the roller blanks having a predetermined length from the rod or wire after being partially severed by the cutter.

A further object is to provide in a wire or rod cutting machine, a cutter movable to cut a V-shaped groove in the rod and a break-off member movable in timed relation to the cutter to break the rod at the apex of the groove to thereby form blanks adaptable to be finished into quill rollers.

Other objects and objects relating to details of construction and methods of manufacture will be apparent from the drawings and the detailed description to follow.

In the drawings in which like numerals refer to like parts throughout the several views, Fig. 1 is a top plan view of a wire or rod cutting machine, showing my invention incorporated therein.

Fig. 2 is a fragmentary side elevational view, looking in the direction of the arrows on the line 2—2 of Fig. 1, showing the operating means for the cutter and the break-off member.

Fig. 3 is a sectional view taken on the line 3—3 of Fig. 1, showing the gearing for driving the cams shown in Fig. 2 for operating the cutter and break-off member. Fig. 4 is a sectional view taken on the line 4—4 of Fig. 2, showing the mechanism for operating the cutter.

Fig. 5 is a sectional view taken on the line 5—5 of Fig. 2, showing the mechanism for operating the break-off member.

Fig. 6 is a diagrammatic view showing the relative position of the tool holder, cutter and rod, at the time the rod is fed to the position to be cut.

Fig. 7 is a view similar to Fig. 6, showing the position of the tool holder and cutter when the cutter starts cutting the rod.

Fig. 8 is a view showing the tool holder and cutter at the finish of the cutting operation.

Fig. 9 is a perspective view of a roller blank after being severed from the rod.

In the drawings, I have illustrated a machine adaptable for cutting rods or wire into predetermined lengths, which machine may be one of several makes now available on the market and in which my invention has been incorporated. As illustrated, the machine has a base comprised of longitudinally extending rails 10 and cross members 11, 12 and 13. The cross members 11 and 12 have bearings 15 and 16 thereon for rotatably supporting the hollow driving shaft 14 which is maintained in position therein by the bearing caps 15' and 16' held down by the screws 17. A stepped pulley 18 on the shaft 14 may be driven by a belt 19 from any suitable source of power, in a manner to vary the speed of the working parts as is well understood. The shaft 14 also carries a gear 21 which meshes with a gear 22 on a counter shaft 23. A gear 24 on the counter shaft 23 meshes with a gear 25 on a second counter shaft 26 on which is a gear 27 which meshes with a gear 28 on a third counter shaft 29. The gears 21 and 22, 24 and 25, and 27 and 28 provide a driving train for the several operating parts of the machine.

The machine heretofore described forms no part of my invention except as the same is incorporated therein and, therefore, a further detailed description of the machine per se is not thought necessary.

The work to be operated upon which comprises a wire or rod A is fed or inserted through the hollow shaft 14 as is best shown in Fig. 1, and is moved against a stop 30 carried by the member 31 slidable to and fro on the frame side rails 10 and preferably oscillated by mechanism (not shown) from the counter shaft 23. As the member 31 and the stop 30 carried thereby and the operating means therefor may be of a construction such, for example, as is now used on a Brown and Sharpe machine, a further description of the same is unnecessary, except to state that the stop 30 moves to the position shown in dotted lines on Fig. 1 to limit the forward movement of the rod A and that it then backs away from the rod during the time the roller blank is being cut from the rod.

The cutter and the operating mechanism therefor will now be described:

The cross member 13 is formed to provide a way or tongue 32 on which is slidably mounted the head or plate 33, the latter being grooved at 34 to fit over the tongue 32, as is best shown in Fig. 2. The head 33 is provided with a slot 35 and with a smaller slot 36 (see Fig. 4), which extend transversely to the groove 34 to provide a shoulder 37, a bolt 38 being carried by the plate 33 so that the head 39 thereof will clamp against the shoulder 37 to provide a spindle or support for the tool or cutter holder 40. As shown in Fig. 4, the bolt 38 extends through the cutter holder 40 to provide a pivotal support therefor, the same being held against displacement by the nut 41 screw-threaded on to the bolt 38. The cutter holder 40 is slotted at 42 to receive the cutting tool 43 which may be held in position therein by the set screws 44. The slot 42 in the cutter holder 40 is so positioned that the cutter held therein extends obliquely to the rod A for a purpose to be hereinafter described. As the cutter holder 40 is set relatively close to the drive shaft 14, the former is cut away or notched at 45 to permit oscillation of the holder 40 without in any way interfering with the driving shaft 14 or other parts of the machine.

The cross member 13 has brackets 46 depending therefrom which provide journals or supports for the counter shaft 29 and also for the rock shaft 47. A bell crank lever 48 adapted to oscillate on the rock shaft 47 is provided with an upper arm 49 which extends through a slot or opening 50 in the cross member 13 and having its head 50' extending into a slot or groove 51 formed in the head 33 to move the cutter holder 40 carried thereby to and fro on the cross member 13. The bottom arm 52 of the bell crank 48 is forked at 53 to receive the roller 54 carried thereby. A cam 55 mounted on the counter shaft 29 engages with the roller 54 mounted in the arm 52 of the bell crank 48 for oscillating the bell crank and thus moving the head or plate 33 together with the cutter holder 40 and cutter 43 carried thereby fore and aft transversely of the longitudinal axis of the machine.

As the counter shaft 29 is rotated by the gear train from the driving shaft 14 by the gears 21, 22, 24, 25, 27 and 28, the cam 55 will also be rotated to oscillate the bell crank 48 and with it the head 33 and the parts carried thereby from inoperative position to the full cutting position shown in Fig. 4, at which time the roller 54 carried by the bell crank 48 will have reached the high point 55' of the cam 55. At that time the roller blank B has been partially severed from the rod A, as is shown in Figs. 1 and 4, and is in condition to be broken from the rod by the break-off mechanism hereinafter to be described. A coil spring 56 has its ends looped over pins 57 and 58 extending from the plate 33 and cross member 13 respectively, to retract the plate 33, the cutter holder 40 and cutter 43 carried thereby when the roller 54 passes over the high point 55' of the cam 55 to thus move the cutter 43 out of contact with the rod A after each cutting operation.

The cutter holder 40 is provided with an extension or stop member 60 which bears against an adjustable stop 61 carried by the plate 33 when the cutter 43 is backed away from the rod A, or is in its inoperative position, as is best shown in Fig. 6. The cutter holder 40 also has a second extension or stop member 62 adapted to move into engagement with the pin or stop 63 carried by the cross member 12 as the cutter holder is moved forwardly toward work-cutting position. As the plate 33 and the cutter holder 40 and cutter 43 are moved forwardly to cutting position by the cam 55 acting on the roller 54 to oscillate the bell crank 48 as previously described, the stop 62 comes into engagement with the stop 63 carried by the cross member 12 by the time the tool 43 engages with the rod A, as shown in Fig. 7, whereupon continued forward movement of the plate 33 will cause the cutter holder 40 to pivot on the bolt 38 and thus move the stop 60 away from the stop 61 and cause the cutter 43 to swing more obliquely toward the work and so that the end thrust will be exerted against the portion of the rod A extending from the drive shaft 14 and not against roller blank B as the same is being cut from the rod. I provide a coiled spring 64 having its one end looped from the stop member 62 and its opposite end secured to a pin 65 carried by the cross member 12 which exerts a pulling force upon the tool holder 40 tending to cause the same to rotate in counterclockwise direction, or to rotate to a position so that the stop 60 carried by the cutter holder 40 will engage or oscillate against the tension of the spring when the stop 62 comes into engagement with the stop 63 as is best shown in Fig. 8.
While I have shown and described the cutter 43 as being set to cut a groove in the rod A to leave enough stock to provide a small flat end on the blank B after it is severed from the rod A, as a quill roller formed in this manner is desirable for many commercial uses, it will, of course, be understood that the blank may be completely severed from the rod by the cutter 43, if desired. The cutter 43 will operate in the same manner as previously described except that its setting in the cutter holder 40 may be changed or the throw of the cam 55 may be increased to provide the deeper cut.

The break-off mechanism will now be described:
A plate or head 66 slidable to and fro on the cross member 13 is slotted at 67 to receive a break-off member 68 secured in adjusted position therein by the set screws 69. Adjacent to the cam 55, a second cam 70 is non-rotatably secured on the counter shaft 29 which operates on a roller 71 carried by the double arm lever 72 pivotally supported on the rock shaft 47 and which has a link 73 pivotally connected at 74 at its end opposite to the roller 71. The link 73 is pivotally connected at 75 to a plate 76 attached to the underface of the plate or head 66. A coil spring 77 having one end attached to a screw 78 carried by the plate 76 and having in its opposite end secured to a pin or eye 79 attached to the cross member 13, tends to maintain the roller 71 in contact with the cam 70 at all times and to pull the plate 66 and break-off member 68 to inoperative position. From the foregoing description of the break-off mechanism, it will be seen that as the cam 70 rotates with the counter shaft 29, the high point 70' thereof being in engagement with the roller 71 carried by the lever 72, that the link 73 will be moved to the left from the position shown in Fig. 5 and thus slide the plate

66 and the break-off member 68 carried thereby toward the roller blank B, the parts being proportioned so that the break-off member 68 will exert pressure on the roller blank B sufficiently to sever the same from the rod A. The cams 55 and 70 are mounted on the counter shaft 29 to operate in timed relation so that the break-off member 68 will come into action after the tool 43 has begun to move rearwardly or away from the work or from the position shown in Fig. 8 toward the position shown in Fig. 6. The operation of the cutting and break-off mechanism will now be described: The rod A is fed through the hollow drive shaft 14 until the end thereof engages with the stop 30 carried by the member 31 which has been moved to the position shown in dotted lines in Fig. 1 whereupon the cam 55 on the counter shaft 29 will cause the bell crank 48 to move the plate 33 and with it the cutter holder 40 and cutter 43 toward the work, thus bringing the stop 62 carried by the cutter holder 40 into engagement with the stop 63 carried by the cross member 12 so that upon further forward movement of the plate 33, the cutter holder 40 will be oscillated upon its pivot 38 to bring the cutter 43 against the work so that its cutting face will bear against the unsevered portion of the rod A and not put any thrust on the unsupported end thereof which when severed comprises the roller blank B.

By cutting the rod after this fashion, the roller blank is formed with tapered ends, as is clearly shown in Figs. 8 and 9, except for the small flat portion at the apex of the cone which I prefer not to completely sever from the rod. As soon as the cutter 43 backs away from the work, the cam 70 on the counter shaft 29 comes into action to move the plate 66 and the break-off member 68 carried thereby to the left from the position shown in Fig. 5 so that the break-off member 68 will bear against the roller blank portion exerting sufficient force thereon to break the same from the rod thus completing the cutting and severing of the roller blank B from the work.

After the blank is severed from the rod, the rod A will be automatically or manually moved forward to again engage with the stop 30 whereupon the cutting and break-off operation will again be repeated.

While I have shown one embodiment of a cutting mechanism and also a break-off mechanism, it will be well understood by those skilled in the art that changes in size, proportion, shape and construction and also in the method of operation thereof may be resorted to by those skilled in the art without departing from the spirit and teachings of my invention and, therefore, the scope of my invention is to be limited only by the scope of the sub-joined claims.

What I claim is:

1. A machine for cutting roller blanks comprising, a frame, a drive shaft rotatably supported thereby having an opening therethrough receiving a rod extending therebeyond, a counter shaft driven by said drive shaft, a cam on said counter shaft, a cutter holder movable transversely of said machine, means to oscillate said holder during the transverse movement thereof, a cutter carried by said holder movable obliquely against said rod by said cam to cut a V-shaped groove therein, a second cam on said counter shaft, and a break-off member operated by said second cam to break said rod at said groove to sever the roller blank therefrom.

2. A machine for cutting roller blanks comprising, a frame, a drive shaft rotatably supported thereby receiving a rod rotatable therewith, an oscillating cutter holder having transverse movement relative to said machine, a cutter carried by said holder driven by said drive shaft movable obliquely against said rod operating to exert a side thrust only on the supported end of said rod and cut a V-shaped groove therein, and a break-off member operatively carried by said drive shaft in timed relation to said cutter to break said rod at said groove to sever the roller blank therefrom.

3. A machine for cutting roller blanks comprising, a frame, a drive shaft rotatably supported thereby receiving a rod rotatable therewith, an oscillating cutter holder transversely movable by said drive shaft against said rod operating to exert a side thrust only on the supported end of said rod and cut a V-shaped groove therein, and means operated by said drive shaft in timed relation to said cutter to break said rod at said groove to sever the roller blank therefrom.

4. A machine for cutting roller blanks comprising, a frame, a drive shaft rotatably supported thereby receiving a rod rotatable therewith, a cutter holder operatively driven by said drive shaft to move transversely of said machine, means to oscillate said holder during its transverse movement, a cutter supported by said holder operative to cut a groove in said rod upon the transverse and oscillatory movements of said holder, and means operated from said drive shaft to break said rod at the connected part of said groove to sever the roller blank therefrom.

5. A machine for cutting roller blanks comprising, a frame, a drive shaft rotatably supported thereby receiving a rod rotatable therewith, a cutter holder operatively driven by said drive shaft to move transversely of said machine, means to oscillate said holder during its transverse movement, a cutter supported by said holder operative to cut a groove in said rod exerting side thrust only on the supported end thereof upon the transverse and oscillatory movements of said holder, and means operated from said drive shaft in timed relation to said cutter to break said rod at the connected part of said groove after the cutting operation.

6. In combination with a machine for cutting roller blanks from a rod having a frame, driving means, a counter shaft, and means for driving said counter shaft from said driving means, a plate movable transversely of said machine, a cam on said counter shaft, a bell crank supported by said frame engageable with said cam to move said plate toward said rod, a cutter holder pivotally supported by said plate, means to rotate said holder during the transverse movement thereof, and a cutter supported by said holder movable obliquely relative to said rod against the same to cut a groove therein, said cutter exerting side thrust on only the supported end of said rod.

7. In combination with a machine for cutting roller blanks from a rod having a frame, driving means, a counter shaft, and means for driving said counter shaft from said driving means, a plate movable transversely of said machine, a cam on said counter shaft, a bell crank supported by said frame engageable with said cam to move said plate toward said rod, a cutter holder pivotally supported by said plate, means to rotate said holder during the transverse movement thereof, a cutter supported by said holder movable obliquely relative to said rod against the same to cut a groove therein, and means operated by said counter shaft to break said rod at the connected part of said groove to sever the roller blank therefrom.

8. In combination with a machine for cutting roller blanks from a rod having a frame, driving means, a counter shaft, and means for driving said counter shaft from said driving means, a plate movable transversely of said machine, a cam on said counter shaft, a bell crank supported by said frame engageable with said cam to move said plate toward said rod, a cutter holder pivotally supported by said plate, means to rotate said holder during the transverse movement thereof, a cutter supported by said holder movable obliquely relative to said rod against the same to cut a groove therein, a break-off member, a second cam on said counter shaft, and means connected with said break-off member operated by said second cam to move said break-off member in timed relation to the cutting operation to sever the roller blank from said rod.

9. In combination with a machine for cutting roller blanks from a rod having a frame, driving means, a counter shaft, and means for driving said counter shaft from said driving means, a cam on said counter shaft, a plate supported by said frame, means operated by said cam for moving said plate transversely of said machine toward said rod, a cutter holder pivotally supported by said plate, means to rotate said holder during the transverse movement of said plate, a cutter secured to said holder moved obliquely against said rod by the rotation of said holder to form a conical end in the projecting portion of said rod.

10. In combination with a machine for cutting roller blanks from a rod having a frame, driving means, a counter shaft, and means for driving said counter shaft from said driving means, a cam on said counter shaft, a plate supported by said frame, means operated by said cam for moving said plate transversely of said machine toward said rod, a spring for returning said plate to inoperative position, a cutter holder pivotally supported by said plate, means to rotate said holder during the transverse movement of said plate, a cutter secured to said holder moved obliquely against said rod by the rotation of said holder to form a conical end in the projecting portion of said rod.

11. A machine for cutting roller blanks comprising, a frame, drive shaft rotatably supported thereby receiving a rod rotatable therewith, a cutter holder, a cutter supported thereby, means to move said holder transversely to said machine, and means to rotate said holder during its transverse movement, said last named means causing said cutter to move against said rod to exert a side thrust only on the supported end thereof and cut a V-shaped groove therein.

12. A machine for cutting roller blanks comprising, a frame, a drive shaft rotatably supported thereby receiving a rod rotatable therewith, a cutter, means to move said cutter transversely of said machine, and means to oscillate said cutter against said rod during its transverse movement to exert a side thrust only on the supported end of said rod and cause said cutter to cut a groove therein.

KARL L. HERRMANN.